United States Patent Office 3,524,766
Patented Aug. 18, 1970

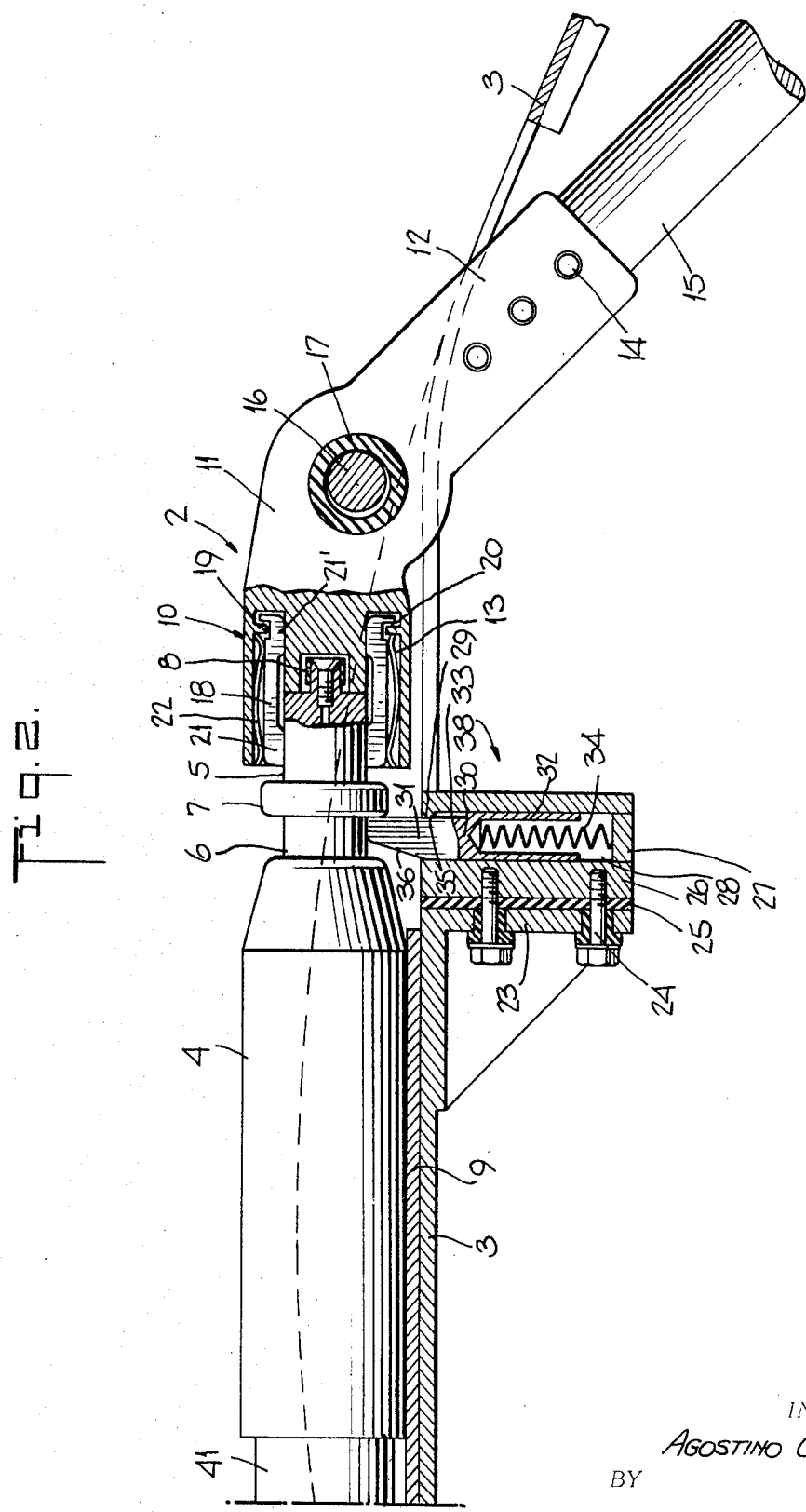

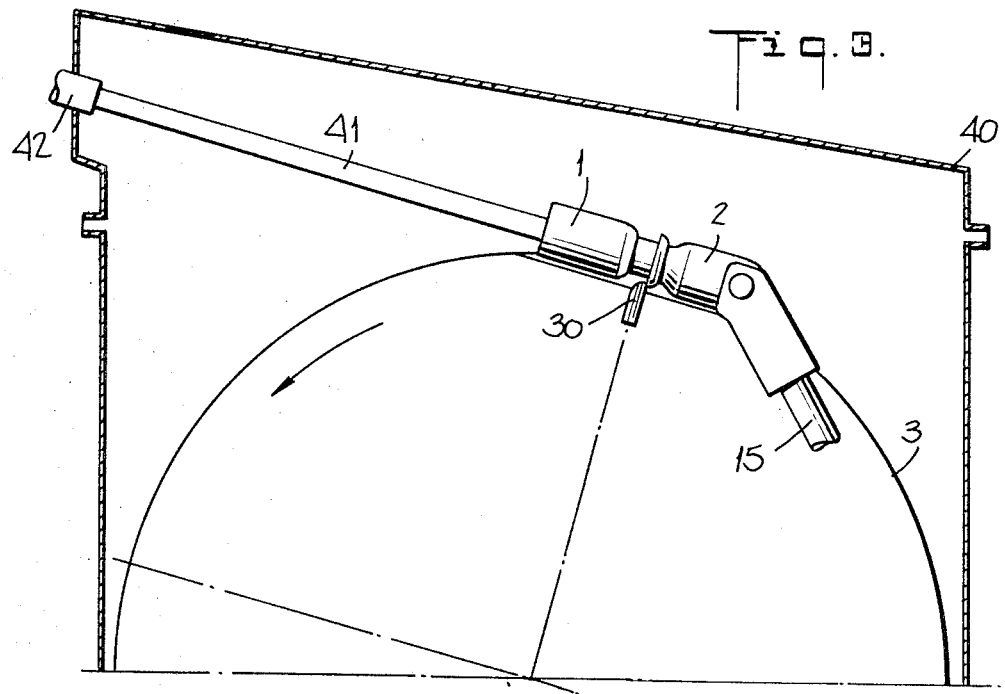
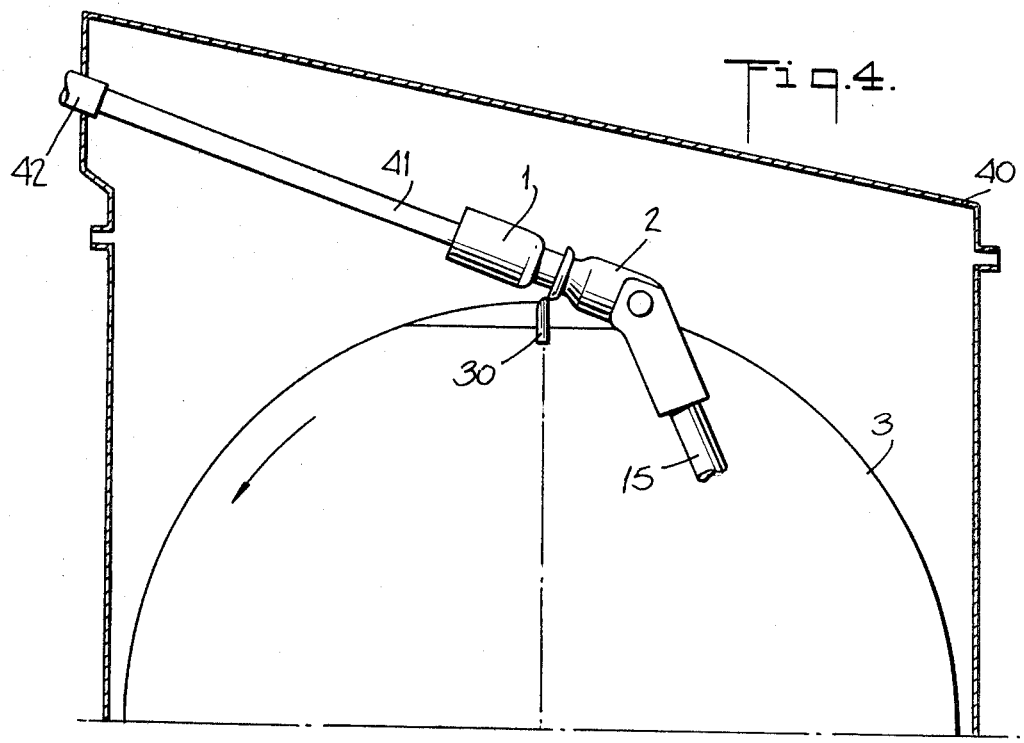

3,524,766
APPARATUS AND METHOD FOR THE MANUFACTURE OF ELECTRIC CABLES IMPREGNATED WITH INSULATING LIQUID
Agostino Oriani, Milan, Italy, assignor to Pirelli, S.p.A., Milan, Italy, a corporation of Italy
Filed Mar. 11, 1968, Ser. No. 712,009
Claims priority, application Italy, Mar. 25, 1967, 14,188/67
Int. Cl. B05c 5/00; H01b 13/00
U.S. Cl. 117—231
11 Claims

ABSTRACT OF THE DISCLOSURE

Improvement in the manufacture of oil-filled electric cables wherein the cable core is capable of being automatically removed from the drum during the sheathing operation.

---

This invention relates to the manufacture of electric cables impregnated with insulating liquid and more particularly to the manufacture of so-called "oil-filled" electric cables covered with a sheath of lead or other suitable material.

In the well known manufacture of so-called "oil-filled" electric cables the insulated cable cores are wound on appropriate drums, dried under vacuum, impregnated with oil and covered with a sheath of lead or of another suitable material without any contact with air. Alternatively, the insulated cable cores are dried and sheathed under vacuum and then impregnated.

The drying and the possible oil impregnation of the cable cores is carried out by placing the drums on which the cable cores are wound into appropriate tanks in such a manner that the drum can rotate. Such tanks are defined as "vertical" or "horizontal" if the drum can be rotated either about a horizontal or a vertical axis, respectively. The cable core wound on the drum and placed in the tank is dried by passing an electric current through the core. The prior art accomplished this by attaching two hawsers to the opposite ends of the cable core called, respectively, the "forward hawser" and the "tail hawser," which are then attached to electrical connections in the outside wall of the tank. The hawsers are connected to the cable core through appropriate end caps.

The forward hawser allows the opening of the tank when the oil level inside the tank has been lowered so that it may be connected to the sheathing press while the cable core is maintained immersed in the oil.

The tail hawser is an extensive electric connection which permits the entire length of cable core to be sheathed without having to disengage it from the electrical connection associated with the tank.

The functions of the forward and tail hawsers and the manner in which the cable cores are sheathed is more fully described and illustrated in U.S. Pat. No. 3,013,912 issued Dec. 19, 1961.

Some improvements to the process described in U.S. Pat. No. 3,013,912 have permitted the elimination of the forward hawser by connecting the cable core directly to the electrical connection associated with the opening or mouth of the drying or impregnation tank. Considerable advantages have been obtained in this way since the process is facilitated. Further advantages, however, could be obtained by the elimination of the tail hawser also.

At the end of the sheathing operation for covering the cable core, namely when the self-sealing end of the cable core has been covered with the sheath and has been drawn through the sheathing press, the tail hawser is still connected to the cable core at one side and to the electrical connection associated with the drying or impregnation tank at the other side. At this point the self-sealing end of the cable core must be disengaged from the tail hawser in order to free the covered cable core and to effect on the latter the operations necessary for the preparation of the cable. Thereafter, the tail hawser must be recovered to enable the plant to carry out a new operating cycle.

The recovery of the tail hawser involves a considerable loss of time and the employment of a large number of operators. This operation, after the detachment of the tail hawser from the end of the sheathed cable core, is carried out by means of the following steps:

(a) Removal of the lead sheath from the portion of tail hawser issued from the sheathing press;

(b) Unthreading of the hawser from the sheathing press, causing it to slide rearward;

(c) Opening of the connecting sleeve between the tank and the sheathing press in order to withdraw the tail hawser; and (d) Opening the drying or impregnation tank and disconnecting the tail hawser from the electrical connection in the tank.

The recovery of the tail hawser, besides requiring a considerable amount of time, must be carried out with the greatest possible accuracy to prevent any damage to the sheathing press. Furthermore, the necessity for opening the tank has the drawback of exposing the impregnating oil to the atmospheric air. Moreover, the tail hawser itself is a cause of contamination of the oil which considerably increases the time necessary for washing the tank and the drum.

The present invention eliminates the above indicated drawbacks by avoiding the use of a tail hawser in the process for the manufacture of oil-filled electric cables. The elimination of the tail hawser is accomplished by providing an apparatus for the automatic detachment of the cable core from collecting drum disposed inside the drying or impregnation tank near the end of the sheathing operations. The apparatus comprises a clamp mounted on the cable drum and having a first end rotatable in a plane substantially perpendicular to the axis of the cable drum from a position substantially tangent to the drum to a raised position more radial with respect to the drum. An electrical conducting member is connected to a second end of the clamp and to an electrical contact through an outside wall of the drying or impregnation tank. The cable core has a self-sealing end capable of being attached and detached to a first end of the clamp, the cable core end being in substantially the same plane of rotation as the clamp when attached to the clamp, and having electrical contact means wherein the cable core is electrically connected to the electrical conducting member connected to the second end of the clamp. Cooperating means are provided on the drum and the cable core end to prevent the cable core end from detaching from the clamp when the first end of the clamp is in the position substantially tangent to the drum, but which allows the cable core end to detach from the clamp when the first end of the clamp is in the raised position radial to the drum.

According to a preferred embodiment, the rotatable clamp is constituted by two elements forming an elbow-shaped structure which is pivotally mounted at elbow itself.

The second element which is inclined towards the inside of the drum, is connected to an electrical conducting member, generally a flexible conductor, while the first element, inter alia, acts as an electric contact for the self-sealing cable core end thereby completing an electrical circuit from the opening or mouth of the tank, through the cable core and the flexible conductor to an outside wall of the tank.

It has been found advantageous to attach the self-sealing cable core end to the clamp by means of a plug and socket type arrangement. For this purpose, according to one embodiment of the invention the first element of the clamp is provided with a cavity which is the socket, and the self-sealing cable core end has a terminal end intended to penetrate into the socket and to act as a plug.

The socket is preferably constructed with a plurality of gripper fingers inserted inside the cavity of the first element of the clamp with the interposition of appropriate springs between them and the surface of the cavity. The gripper fingers are disposed side-by-side around a circular projection in the cavity, thereby forming a radially expansible layer. The circular projection or lip provided in the cavity penetrates into and cooperates with a transversal groove provided in the surface of each gripper finger which faces the spring, thereby acting as a stop for each of the gripper fingers. The inner surface of each gripper finger is formed by a flat central portion and two raised portions at the sides of the central portion. The terminal end of the self-sealing cable core end which penetrates the socket in the cavity makes contact with the outer raised portion of the gripper fingers while the inner raised portion makes contact with the inner body of the clamp.

The means associated with the drum and with the self-sealing cable core end to prevent any movement of the cable core and in a direction tangent to the drum includes, as regards the cable core end, a circular groove provided in the terminal end of the cable core and bounded toward the plug by a collar whose corner opposite the groove is rounded off. As regards the drum, a latch is provided in a suitable casing secured from below to the body of the drum. The latch emerges from the casing through an opening facing a corresponding opening in the drum body by virtue of the action of a compression spring contained in the casing and extends from the drum body so as to penetrate into the groove of the self-sealing cable core end, thereby contacting a face of the collar.

The surface of the projecting part of the latch, like the face of the collar with which it mates, is perpendicular to the axis of the self-sealing cable core end so as to exert an appropriate stopping action on the cable core end in a direction tangent to the surface of the drum. Moreover, the surface of the latch opposite the surface which mates wtih the collar is slightly inclined so that, during the movement necessary to insert the plug in the socket of the clamp, the action of the rounded-off corner of the collar against said inclined surface will cause the latch to re-enter its casing until the plug has been fully inserted.

Further details of the invention can be deduced from the following description, made with reference to the attached drawings, which represent by way of non-limiting example of particular embodiment of the invention.

In said drawings:

FIG. 2 is a detailed sectional view of a clamping device used in the arrangement of FIG. 1;

FIG. 3 is a fragmentary view of the arrangement of FIG. 1 at one point in the operation thereof; and FIG. 4 is a fragmentary view of the arrangement of FIG. 1 at a further point in the operation thereof.

Figure 1:
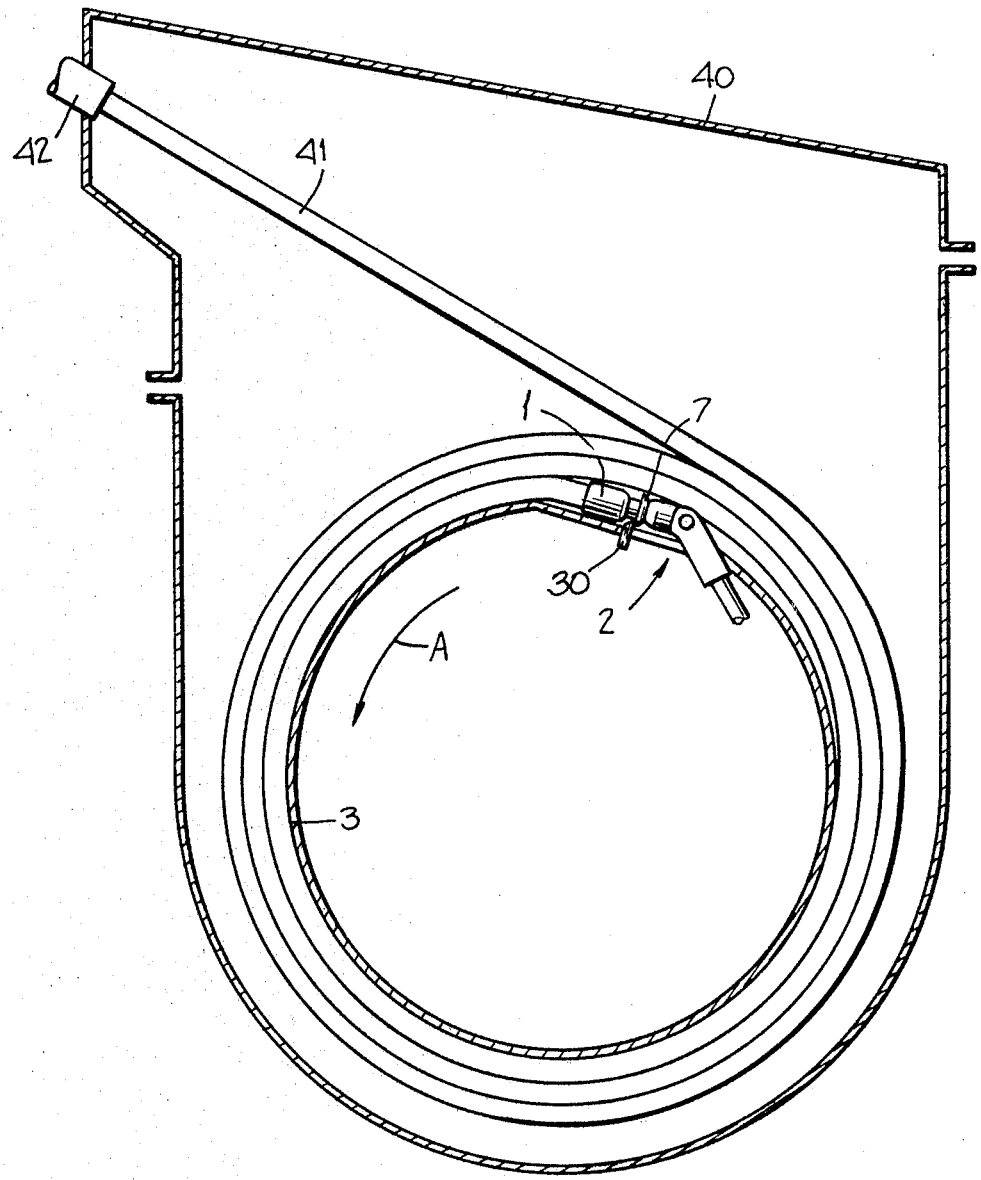
FIG. 1 is a side elevational view, taken in section, of a cable drying and impregnation arrangement incorporating the present invention.

As shown in FIG. 1, a drum 3 is mounted for rotation, in the direction indicated by the arrow A inside a drying and impregnating tank 40. A cable core 41 is wound on the drum 3 with the forward end of the cable core connected to an opening or mouth 42 of the tank 40. The opposite or detachable end of the cable core 1 is shown attached to a clamp 2 and held in place on the clamp by a latch 30 and a collar 7. FIG. 1 shows the relative positions of the tank 40, the drum 3, the cable core 41 and the clamping device 2 during the drying and impregnating operations.

FIG. 2 illustrates in detail the cable core end 1 and its manner of attachment to the clamp 2 on the drum 3 in accordance with the present invention.

An axially bored cylindrical body 4 of metallic material is connected at one end to the detachable end of the cable core 41. The other end of the body 4 is formed with a circumferential groove 6, a circumferential collar 7, and a plug 5 arranged longitudinally in the order stated. The collar 7 is formed with a rounded corner facing the plug 5. A stopper 8 closes an axial hole of the cable core 41 which extends through the plug 5. Interposed between the cable core end 1, and the body of the drum 3, on which the core leans, is a layer of insulating paper board 9.

The plug 5 penetrates into an appropriate socket 10 in the clamp 2. The clamp 2 is constituted by first and second cylindrical elements 11 and 12, joined together in such a way as to impart to the clamp an elbow-shaped configuration. The first element 11 is provided with a cavity 13 containing the socket 10.

One end of a flexible conductor 15 is secured by means of screws 14 in the second cylindrical element 12. The other end of the flexible conductor 15 is connected to an electric contact through an outside wall of the impregnation tank 40 (not shown in the drawings). The clamp 2 is provided with a pivot 16 at its elbow. The pivot 16 is provided with a suitable support (not shown) which is fastened to the drum 3 and which permits the clamp to rotate about the pivot 16 in the plane containing the cable core end 1. The hole of the clamp 2 into which pivot 16 is inserted is covered with an insulating and mechanically resistant material 17.

The socket 10 is constituted by a plurality of gripper fingers 18 disposed side-by-side inside the cavity 13 around a circular projection or lip 19 in the cavity 13, thereby forming a radially expansible layer. The projection or lip 19 extends into corresponding grooves 20 in the surface of each of the gripper fingers; and thereby provides a stop for each of the gripper fingers.

The inner surface of each of the gripper fingers opposite its groove 20 has an intermediate flat portion and two raised projecting portions 21 and 21' in correspondence of which the contact with the plug 5 and with the clamp 2 takes place, respectively. Thus, the gripper fingers act as a bridge for the passage of electrical current from the cable core through the clamp 2 and the flexible conductor 15.

When the cable core is wound up on the drum 3, the plug 5 is inserted in the socket 10 and the end of the cable core is aligned with the element 11 of the clamp 2 on the surface of the drum body, suitably flattened. The socket 10 of the clamp is not capable of keeping the cable core end 1 stationary in an axial direction since the force exterted by means of the springs 22 between the gripper fingers and the surface of the cavity 13 is directed perpendicularly to the plug 5. The cable core end 1 is kept stationary, however, by means of a suitable hooking device 38, which is described hereinafter.

The hooking device 38 is secured from below to the body of the drum 3 by means of an angle bar 23, one face of which is fastened to the body of the drum. The hooking device is secured to the other face of the angle bar by means of insulated screws 24 and with the interposition of a sheet of insulating paper board 25. The hooking device 38 includes a base 26 connected to the angle bar 23, and a cover 27 secured to the base by means of screws (not shown). The base and cover cooperate to define a rectilinear internal cavity 28. The cavity has an opening 29 out from the drum 3. A latch 30 is slidably mounted inside the cavity 28. The latch 30 consists of a narrower solid portion 31, which can emerge from the opening 29, and a larger hollow portion 32, which is connected to the narrower portion by means of a step 33.

The hollow portion 32 contains a compression spring 34 which pushes the latch outside the opening 29 by reacting against the casing. The step 33, acting as a stop against the shoulder 35 of the opening 29, limits the outward movement of the latch.

The portion 31 emerging from the opening 29 extends into the groove 6 in the cable core 41. One surface 36 of the latch portion 31 is directed towards the cable core 41 and is shaped as an inclined plane at its outermost portion. Now, when the cable core end is moved longitudinally so that its plug 5 becomes inserted into the socket 10, the collar 7 presses with its rounded corner against the inclined plane surface 36 of the latch 30 and pushes it into the opening 29, against the action of the spring 34, and thereby permits the plug 5 to enter into the socket 10. When the collar 7 has passed the end of the latch, the latch, by virtue of the action of the spring 34, is pushed into the groove 6. At this point return or withdrawal movement of the cable core is prevented, since the mating surfaces of the latch portion 31 and the collar 7 facing it, are flat and perpendicular to the axis of the cable core end 1. The latch 30 thus prevents any movement of the cable end 1 in a direction tangential to the body of the drum.

When the cable is wound up on the drum, radial movement of the cable core end is prevented by the winding tension. However, when the cable core 41, during the sheathing operation, is fully paid off from the drum, the cable core end 1 begins to raise from the drum. This produces a pivoting action at the pivot 16 once the latch 30, in consequence of the rotation of the drum 3, crosses the point of tangency of the drum with the paying off line between the opening 42 of the tank and the drum.

This situation is clearly illustrated in FIGS. 3 and 4 in which the cable core 41 is shown as the paying-off line from the drum 3 to the opening 42 of the tank 40. In FIG. 3 the cable core end 1, the clamp 2, and the latch 30 are diagrammatically represented at the point at which the cable core begins to be raised as the clamp pivots at 16. Thereafter, as shown in FIG. 4, the cable core end detaches from the latch and the clamp near the end of the sheathing operation.

Once the cable core end is free from the latch, it becomes detached automatically from the plug 5 since the socket 10 is unable to provide a longitudinal restraint sufficient to retain the plug 5.

After the cable end has come out from the press, the lead sheath is removed while carefully maintaining the passage through the press tightly closed. The oil thus remaining in the tank may thereafter be sent directly to reservoirs for re-utilization without any need of degasification, since it has not come into contact with the air and has not been contaminated.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. Apparatus for use in the manufacture of electric cables impregnated with insulating liquid for the automatic detachment of a cable core from a cable drum disposed inside a tank near the end of a sheathing operation, said apparatus comprising a clamp having first and second pivotally interconnected ends and adapted to be mounted on a cable drum for rotation of said first end in a plane substantially perpendicular to the axis of said cable drum from a position substantially tangent to said cable drum to a more radial position with respect to said cable drum, said second end of said clamp being adapted to be connected with electrical conducting means attached to an electrical contact through an outside wall of said tank, connecting means on said first end of said clamp adapted to accommodate a cable core end and to maintain said cable core end in substantially the same plane of rotation as said clamp when said cable core end is connected to said connecting means, said connecting means including electrically conductive gripper elements arranged to press radially on the end of a cable core accommodated by said connecting means and to establish electrical contact therewith without preventing said cable core end from detaching from said connecting means in response to a longitudinal force on said cable core end when said clamp is in said more radial position whereby said cable core end may be maintained connected to said connecting means when said clamp is in said position substantially tangent to said cable drum and may be detached in response to said longitudinal force when said cable core end and said clamp are raised to said position radial to said cable drum, and electrical conducting means within said clamp interconnecting said gripper elements and said second end of said clamp.

2. Apparatus for use in the manufacture of electric cables impregnated with insulating liquid for the automatic detachment of a cable core from a cable drum disposed inside a tank near the end of a sheathing operation, said apparatus comprising a clamp having first and second ends and mounted on a cable drum for rotation of said first end in a plane substantially perpendicular to the axis of said cable drum from a position substantially tangent to said cable drum to a more radial position with respect to said cable drum, said second end of said clamp adapted to be connected with electrical conducting means attached to an electrical contact through an outside wall of a tank, connecting means on said first end of said clamp adapted to accommodate a cable core end and maintain said cable core end in substantially the same plane of rotation as said clamp when said cable core end is connected to said connecting means without preventing said cable core end from detaching from said connecting means in response to a longitudinal force on said cable core end, abutment means on said drum adapted to cooperate with means on said cable core end to prevent said cable core end from detaching from said clamp when said first end of said clamp is in said position substantially tangent to said cable drum but which allows said cable core end to detach from said clamp when first end of said clamp is raised to said more radial position in response to said longitudinal force, and electrical connecting means on said clamp wherein said cable core end is electrically connected to said electrical conducting means when said cable core end is connected to said connecting means.

3. Apparatus for use in the manufacture of electric cables impregnated with insulating liquid for the automatic detachment of a cable core from a cable drum disposed inside a tank near the end of a sheathing operation, said apparatus comprising a clamp having first and second ends and being mounted on a cable drum for rotation of said first end in a plane substantially perpendicular to the axis of said cable drum from a position substantially tangent to said cable drum to a more radial position with respect to said cable drum, a tank wherein said cable drum is rotatably mounted, said second end of said clamp being connected via electrical conducting means attached to an electrical contact through an outside wall of said tank, connecting means in said first end of said clamp adapted to accommodate a cable core end and maintain said cable core end in substantially the same plane of rotation as said clamp when said cable core end is connected to said connecting means without preventing said cable core end from detaching from said connecting means in response to a longitudinal force on said cable core end, abutment means on said cable drum adapted to cooperate with means on said cable core end to prevent said cable core end from detaching from said clamp when said first end of said clamp is in said position substantially tangent to said cable drum which allows said cable core end to detach from said clamp when first end of said clamp is raised to said more radial position in response to said longitudinal force, and electrical connecting means on said clamp wherein said cable core end is electrically connected to said electrical conducting means when said cable core end is connected to said connecting means.

4. Apparatus for use in the manufacture of electric cables impregnated with insulating liquid for the automatic detachment of a cable core from a cable drum disposed inside a tank near the end of a sheathing operation, said apparatus comprising a clamp having first and second ends and mounted on a cable drum for rotation of said first end in a plane substantially perpendicular to the axis of said cable drum from a position substantially tangent to said cable drum to a more radial position with respect to said cable drum, a tank wherein said cable drum is rotatably mounted, said second end of said clamp being connected via electrical conducting means attached to an electrical contact through an outside wall of said tank, connecting means in said first end of said clamp adapted to accommodate a cable core end and maintain said cable core end in substantially the same plane of rotation as said clamp when said cable core end is connected to said connecting means wtihout preventing said cable core end from detaching from said connecting means in response to a longitudinal force on said cable core end cooperating means on said cable drum adapted to cooperate with means on said cable core end to prevent said cable core end from detaching from said clamp when said first end of said clamp is in said position substantially tangent to said cable drum but which allows said cable core end to detach from said clamp when first end of said clamp is raised to said more radial position in response to said longitudinal force, and electrical connecting means on said clamp wherein said cable core end is electrically connected to said electrical conducting means when said cable core end is connected to said connecting means.

5. Apparatus as in claim 1 wherein said connecting means on said first end of said clamp comprises means defining a cavity configured to accommodate said cable core end.

6. Apparatus as in claim 2 wherein said first and second ends of said clamp comprise two elements forming an elbow-shaped configuration which are adapted to be pivotally mounted at said elbow.

7. Apparatus as in claim 2 wherein said connecting means on said first end of said clamp comprises a first cavity, a plurality of gripper fingers disposed side-by-side about the interior of said first cavity and having a spring member interposed between each of said gripper fingers and the interior surface of said first cavity, said gripper fingers thereby defining a second cavity having a configuration slightly smaller than said cable core end and capable of radially expanding against said spring members to accommodate and grip said cable core end by insertion of said cable core end into said second cavity, and wherein said electrical connecting means comprise two raised surfaces on said gripper fingers on the surface opposite the surface contacting said spring members, one of said raised surfaces adapted to electrically contact said cable core end upon insertion into said second cavity and said other raised portion electrically contacting said second end of said clamp, thereby completing an electrical circuit from said cable core end to said electrical contact through said outside wall of said tank.

8. Apparatus as in claim 3 wherein said abutment means comprises a latch projecting from said cable drum and adapted to extend into a groove in said cable core end when said cable core end is attached by said clamp and in said position tangent to said cable drum, thereby preventing said cable core end from detaching from said clamp in a direction tangent to said cable drum, said latch projecting a distance above said cable drum which permits said groove to be free of said latch when said clamp is in said more radial position.

9. Apparatus as in claim 4 wherein said cooperating means comprise a circumferential collar on said cable core end having a rounded corner facing said second cavity, a latch slidably mounted in a cavity in said cable drum and capable of emerging from said cable drum and adapted to contact the face of said collar opposite the face by said rounded corner when said cable core end is attached to said clamp and in said position tangent to said cable drum.

10. Apparatus as in claim 9 wherein said latch is biased to a given outermost position by means of a compression spring member, and wherein the surface of said latch opposite the latch face which contacts said collar is inclined and adapted to slide into said cavity in said cable drum when said rounded collar corner is moved longitudinally against said inclined face until said collar clears said latch when said cable core end is being attached to said clamp.

11. In a method of manufacturing cables of the oil-filled type wherein an insulated cable core having a forward and a tail end is wound on a drum and placed in a processing tank wherein said cable core is first treated and then removed from said drum by pulling said forward end of said cable core out from a mouth of said tank, the steps of attaching said tail end of said cable core prior to winding said cable core on said drum to a clamp mounted on said drum whereby said tail end and said clamp are rotated in a plane substantially perpendicular to the axis of said drum and whereby said tail end is prevented from detaching from said clamp in a direction substantially tangent to said drum, electrically connecting said tail end of said cable core to said clamp and said clamp to an outside wall of said tank, winding said cable core on said drum so that said tail end of said cable core end is maintained substantially tangent to said drum, electrically connecting said forward end of said cable core to an outside wall at said mouth of said tank, and unwinding the treated cable core by pulling said cable core through the mouth of said tank so that said tail end of said cable core end and said clamp are raised radially with respect to said drum thereby allowing said tail end in response to said pulling to detach from said clamp.

References Cited

UNITED STATES PATENTS 3,013,912   12/1961   Priaroggia et al. _____ 156—51

WILLIAM L. JARVIS, Primary Examiner

U.S. Cl. X.R.

117—66; 118—419, 620; 339—16; 29—624